United States Patent [19]

Segoshi

[11] Patent Number: 4,694,191
[45] Date of Patent: Sep. 15, 1987

[54] LAMP POWER SUPPLY CONTROL SYSTEM FOR AN AUTOMOTIVE VEHICLE

[75] Inventor: Toru Segoshi, Yokohama, Japan

[73] Assignee: Nissan Motor Company, Limited, Japan

[21] Appl. No.: 826,977

[22] Filed: Feb. 7, 1986

[30] Foreign Application Priority Data

Feb. 25, 1985 [JP] Japan .................................. 60-34519

[51] Int. Cl.$^4$ ........................... B60Q 7/00; B60Q 3/02
[52] U.S. Cl. .............................. 307/10 LS; 307/10 R; 315/84; 362/74; 200/61.69
[58] Field of Search ................. 307/10 LS, 119, 10 R; 315/84, 77; 362/74, 155; 49/72; 296/147–150; 200/61.69, 61.62; 340/52 R

[56] References Cited

U.S. PATENT DOCUMENTS

| | | | |
|---|---|---|---|
| 1,928,691 | 10/1933 | Huddleson | 200/61.69 |
| 2,840,759 | 6/1958 | Stephenson | 315/84 |
| 3,125,371 | 3/1964 | Krueger | 49/72 |
| 3,151,224 | 9/1964 | Colucci | 200/61.69 |
| 4,115,723 | 9/1978 | Byrne et al. | 307/10 LS X |
| 4,122,371 | 10/1978 | Talmage et al. | 307/10 LS X |
| 4,403,172 | 9/1983 | Sasari et al. | 315/84 X |
| 4,473,871 | 9/1984 | Fuchshuber | 315/84 X |
| 4,517,469 | 5/1985 | Bier | 315/84 X |

Primary Examiner—William M. Shoop, Jr.
Assistant Examiner—Sharon D. Logan
Attorney, Agent, or Firm—Leydig, Voit & Mayer

[57] ABSTRACT

A system for controlling the power supply to an automotive vehicle lamp in which two switch means are connected in series with each other, an interior room lamp in the vehicle compartment, and the power supply, i.e., a vehicle battery, one switch means being closed when a detachable back door is open and open when the back door is closed and the other switch means being open when the back door is detached from the vehicle body. Therefore, the interior room lamp is turned off when the back door is detached even though the first switch means is closed. Consequently, wasteful power drain on the vehicle battery can be avoided when the back door is detached.

9 Claims, 9 Drawing Figures

LAMP POWER SUPPLY CONTROL SYSTEM FOR AN AUTOMOTIVE VEHICLE

BACKGROUND OF THE INVENTION

1. Field of the Invention

The present invention relates generally to a system for controling a power supply for an interior room lamp located on a ceiling portion in a vehicle compartment particularly applicable to vehicles with detachable back doors such as coupe type vehicles.

2. Description of the Prior Art

A conventional lamp power supply control system whose electrical parts are installed at points on a vehicle body includes a switch associated with a back door of a vehicle.

The control system described above is exemplified by Japanese Utility Model Application Unexamined Open No. Sho 55-81433, as shown in FIGS. 1 and 2.

In FIGS. 1 and 2, numeral 1 denotes an interior room lamp mounted on the ceiling portion 2 of the vehicle body 4. Numeral 3 denotes a back door with a rear windshield mounted at the rear end of the vehicle body 4 in such a manner as to be able to pivot about suitable means mounted at the upper rear edge of the vehicle body 4. Switch elements of a switch 5 are installed at a portion of the lower edge of the back door 3 and at the opposing portion of the lower rear edge of the vehicle body 4. The switch 5 is allowed to close when the back door 3 is pivoted upward away from the lower rear edge of the vehicle body 4 and is actuated to open when the back door 3 is pivoted downward into the lock mechanism of the lower rear edge of the vehicle body 4.

In FIG. 1, symbol V denotes a vehicle battery. As shown in FIG. 1, the switch 5 is electrically inserted between the interior room lamp 1 and ground in series with the interior room lamp 1, thus forming an electric circuit. The switch 5 is so constructed as to open when the back door 3 is pivoted downward and its edge is contacted with the lower rear edge of the vehicle body 4 closed and to be closed when the back door 3 is pivoted upwardly away from the lower rear edge of the vehicle body 4 (open). Consequently, when the switch 5 is closed, the interior room lamp 1 is turned on and, on the other hand, when the switch 5 is open, the interior room lamp 1 is turned off.

The above-described conventional interior room lamp power supply control system has a problem described below.

That is to say, since the interior room lamp 1 is turned on when the back door 3 is open, the switch 5 is always closed if the back door 3 is of the detachable type and is detached from the vehicle body 4. Therefore, the electrical power in the vehicle battery V is unnecessarily consumed since the switch 5 remains closed and the interior room lamp 1 continues to be illuminated. Consequently, if the back door 3 is detached from the vehicle body for a long period of time, the battery V may discharge to such an extent that the engine of the vehicle will not start smoothly or cannot be started at all.

SUMMARY OF THE INVENTION

With the above-described problem in mind, it is an object of the present invention to provide a power supply control system and method of the room lamp for an automotive vehicle which can turn off the interior room lamp when a detachable-type back door is detached from a vehicle body. This can be achieved by a system for controlling the power supply to the interior room lamp, comprising: (a) first switch means operatively associated with at least one of the body of the vehicle and a door, the first switch means opened when a door of the vehicle is closed to seal an opening in a vehicle body and closed when the door is open; (b) second switch means operatively associated with at least one of the body of the vehicle and the back door, the second switch means opened only when the back door is detached from the vehicle body and remaining closed when the back door is attached to the body; (c) a lamp connected in series with said first and second switch means and a power source so that said lamp receives power only when said first and second switch means are closed.

BRIEF DESCRIPTION OF THE DRAWINGS

A more complete understanding of the present invention may be obtained from the following description taken in conjunction with the attached drawings in which like reference numerals designate corresponding elements and in which.

DETAILED DESCRIPTION OF THE PREFERRED EMBODIMENTS

Figure 1:
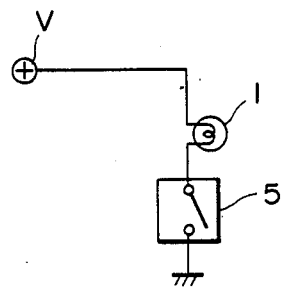
FIG. 1 is a wiring diagram of a conventional lamp switch control system disclosed in Japanese Utility Model Application Unexamined Open No. Sho 55-81433.
Figure 2:
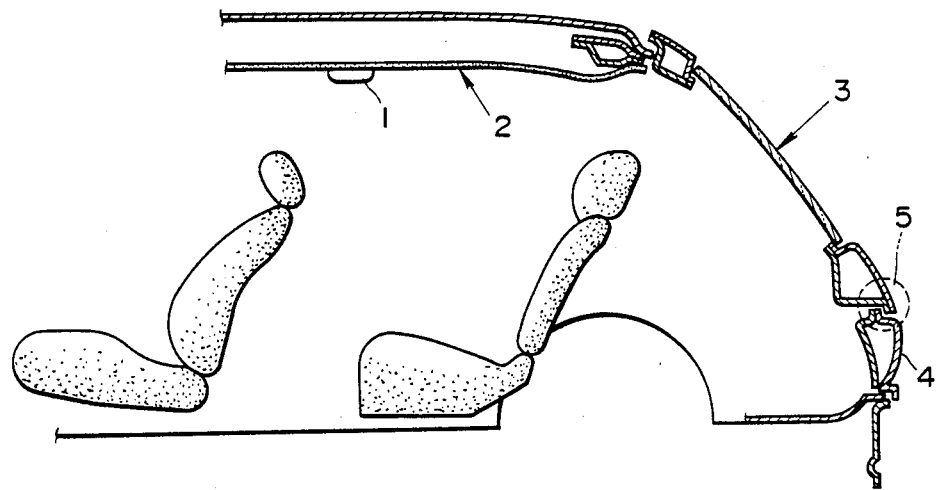
FIG. 2 is a sectional view through a vehicle showing the positional relationship between the interior room lamp and the switch shown in FIG. 1.
Figure 3:
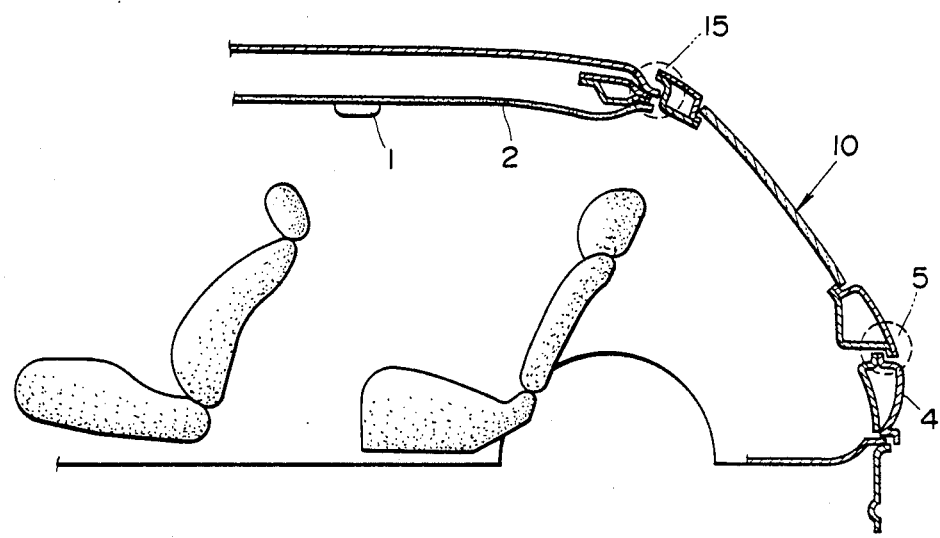
FIG. 3 is a sectional view through a vehicle showing the positional relationship between the interior room lamp and two switches in a preferred embodiment of a lamp switch control system according to the present invention.
Figure 4:
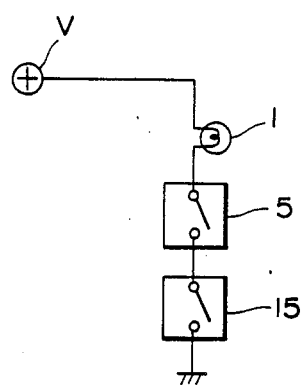
FIG. 4 is a wiring diagram of the control system shown in FIG. 3.

Reference will be made to the drawings in order to facilitate understanding of the present invention.

FIGS. 3 through 8 show a preferred embodiment of the lamp control system according to the present invention.

In these drawings, numeral 10 denotes a detachable back door which is pivotable about the upper edge of the vehicle body 4, i.e., the tail end of the ceiling portion. As in conventional systems, the first switch 5 is installed in the lower edge of the vehicle body 4. When the back door 10 is closed, i.e., the back door 10 is pivoted fully downward into contact with the lower edge of the vehicle body 4, the first switch 5 is open so that the interior room lamp 1 is turned off since the electrical power from the battery V is interrupted. On the other hand, when the back door 10 is open, i.e., the back door 10 is pivoted upward away from the lower edge of the vehicle body 4, the switch 5 is closed so that the interior room lamp is turned on.

Figure 5:
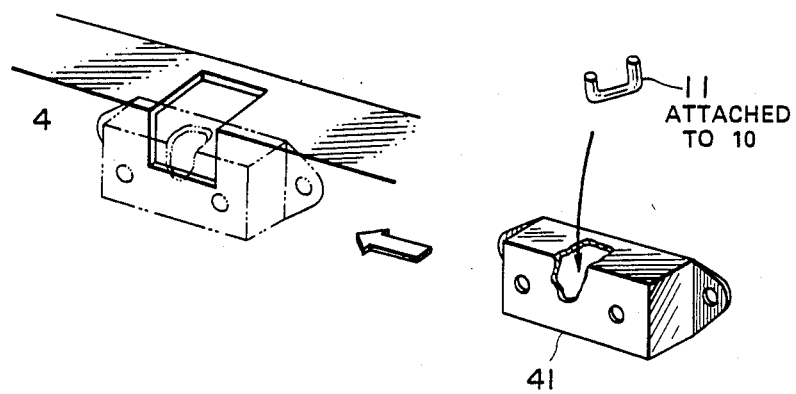
FIGS. 5 is a diagrammatic perspective view of a latch mechanism housing the switch 5 of FIGS. 3 and 4.
Figure 6:
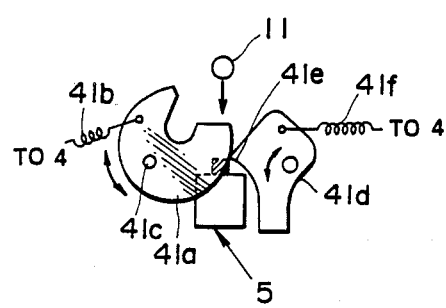
FIGS. 6 and 7 show the internal mechanism of the latch of FIG. 5 and of the switch 5.
Figure 7:
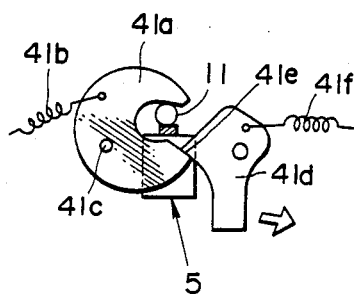

The structure and operation of the first switch 5 is specifically illustrated in FIGS. 5 through 7.

It should be noted that the structures of the vehicle body 4 and switch 5 are also exemplified by Japanese Utility Model Application Unexamined Open No. Sho. 55-81433, the disclosure of which is hereby incorporated by reference.

A lock mechanism 41 is mounted on the lower edge of the vehicle body 4 and a striker 11 is attached to the opposing lower edge of the back door 10. In addition, the lock mechanism 41 comprises a substantially U-shaped lever 41a, a first end of which is fixed to a spring 41b anchored to the lower edge of the vehicle body 4 so that the second end of lever 41a is urged upward about an axis 41c, and a stopper 41d having a pawl 41e, which abuts the outer edge of the lever 41a when the striker 11 is not engaged by the lock mechanism, and an upper end fixed to a spring 41f anchored to the lower edge of the vehicle body 4. It should be noted that the first switch 5 of the push-button type is incorporated in the lock mechanism 41.

In the above-described construction, when the back door 10 is closed, i.e., when the striker 11 enters the lock mechanism 41, the striker 11 depresses the second end of the lever 41a so that the lever 41a is pivoted against the biasing force of the spring 41b. The pawl 41e of the stopper 41d then abuts and retains the second end of the lever 41a and the first end of the lever 41a retains the striker 11, the lock mechanism 41 thus locking the striker 11 in place. At the same time, the striker 11 depresses the push button switch serving as the first switch 5 so that the first switch 5 is opened. Consequently, the interior room lamp 1 is turned off.

When the back door 10 is to be opened, i.e., when the back door 10 is pivoted upward away from the lower edge of the vehicle body 4, an operator first pulls the unsprung end of the stopper 41d to rotate in the direction of the arrow shown in FIG. 7. As a result, the stopper 41d disengages from the first end of the lever 41a so that the lever 41a is free to pivot in accordance with the force of the spring 41b. Consequently, the striker 11 is released by the first end of the lever 41a. At the same time, the striker 11 separates from the first switch 5 so that the first switch 5 closes. Consequently, the interior room lamp 1 is turned on.

Figure 8:
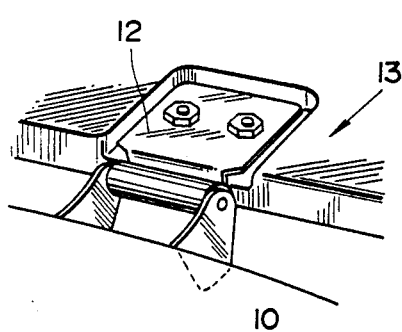
FIGS. 8 and 9 are perspective views of a back door hinge plate and the second switch 15 when the back door is attached and detached respectively.
Figure 9:
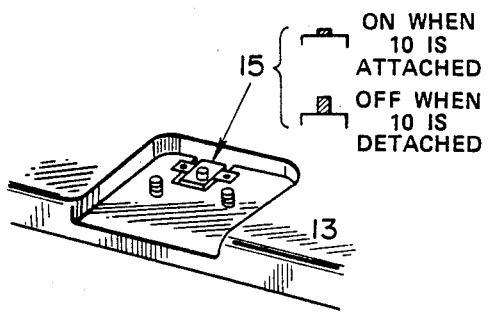

FIGS. 8 and 9 show an example of one of a pair of hinge plates 12 mounted on the back door 10 and in a recessed portion of the roof 13 and a second switch 15 cooperating therewith.

In FIGS. 8 and 9, numeral 13 denotes the roof of the vehicle body 4. One hinge plate 12 is shown fixed to the roof 13, i.e., a hinge mounting of the roof portion 13 by fixing means, for example, a set of bolts and nuts. As shown in FIG. 9, when the back door 10 is detached, the second switch 15 of the push-button switch type is exposed and thereby opened. Therefore, as appreaciated from FIG. 4, the second switch 15 is opened (at the same time, the first switch 5 is closed) so that the interior room lamp 1 will not be supplied with electrical power from the battery V (i.e., the interior room lamp 1 is turned off). In this way, in the inventive lamp control system, the interior room lamp 1 is turned off when the back door 10 is closed, turned on when the back door 10 is open, and turned off when the back door 10 is detached from the vehicle body 4, i.e., the hinge plate 12 of the back door 10 is removed from the hinge mounting recess in the roof 13, specifically by the removal of the threaded nuts on the corresponding bolts.

It should be noted that the mounting positions of the first and second switches 5, 15 are not limited to those shown in the preferred embodiment described above.

Since in the lamp power supply control system according to the present invention two switches controlling the power supply to the interior room lamp are provided at the corresponding points of the vehicle body so as to respond to removal of the back door from the vehicle body, unnecessary power consumption can be avoided when the back door is removed from the vehicle body.

It will clearly be understood by those skilled in the art that the foregoing description is made in terms of the preferred embodiment and various changes and modifications may be made without departing from the scope of the present invention which is to be defined by the appended claims.

What is claimed is:

1. A system for controlling a power supply to a lamp for an automotive vehicle having a body, comprising:
   (a) first switch means operatively associated with at least one of the body of the vehicle and a door, said first switch means opened when the door of the vehicle is closed to seal an opening in the vehicle body and closed when the door is open;
   (b) second switch means operatively associated with at least one of the body of the vehicle and the door, said second switch means opened only when the back door is detached from the vehicle body and remaining closed when the door is attached to the vehicle body;
   (c) a lamp connected in a series with said first and second switch means and a power source so that said lamp receives power only when said first and second switch means are closed.

2. The system according to claim 1, wherein the door is a back door located at a rear end of the vehicle.

3. The system according to claim 2, wherein said first switch means is disposed within a lock mechanism located at the lower edge of the rear end of the vehicle body, for locking the back door in the closed state.

4. The system according to claim 2, wherein said second switch means is disposed within a hinge mounting recess in a roof of the vehicle body.

5. The system according to claim 1, wherein said lamp is an interior compartment lamp located at a ceiling portion of the vehicle body.

6. The system according to claim 1, wherein said first switch means is disposed within a lock mechanism associated with the door and the vehicle body.

7. The system according to claim 1, wherein said second switch means is disposed within a hinge mounting recess in a portion of the vehicle body.

8. The system according to claim 1, wherein said second switch means is automatically opened when the back door is detached from the vehicle.

9. A system for controlling a power supply to an interior compartment lamp for an automotive vehicle, comprising:
   (a) a first switch operatively associated with at least one of the body of the vehicle and a back door, said first switch arranged within a power supply line connected to the interior room lamp and opened when said back door detachably mounted on a rear end of a vehicle body is closed; and
   (b) a second switch operatively associated with at least one of the body of the vehicle and the back door, said second switch opened to interrupt the power supply to the interior room lamp when the back door is detached from the rear end of the vehicle body and remaining closed when the back door is attached to the vehicle body.

* * * * *